(12) United States Patent
Iwasa

(10) Patent No.: US 10,382,639 B2
(45) Date of Patent: Aug. 13, 2019

(54) INFORMATION PROCESSING SYSTEM ACQUIRE TRANSITION NOTIFICATION FROM HOST DEVICE TO TRANSIT TO ENERGY SAVING MODE

(71) Applicant: Keisuke Iwasa, Tokyo (JP)

(72) Inventor: Keisuke Iwasa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 83 days.

(21) Appl. No.: 15/441,391

(22) Filed: Feb. 24, 2017

(65) Prior Publication Data

US 2017/0257505 A1 Sep. 7, 2017

(30) Foreign Application Priority Data

Mar. 3, 2016 (JP) .................................. 2016-041192

(51) Int. Cl.
*G06F 1/32* (2019.01)
*H04N 1/00* (2006.01)
(Continued)

(52) U.S. Cl.
CPC ......... *H04N 1/00896* (2013.01); *G06F 1/266* (2013.01); *G06F 1/3284* (2013.01); *H04N 1/00204* (2013.01); *H04N 1/00891* (2013.01); *G03G 15/02* (2013.01); *G03G 15/5004* (2013.01); *G06F 1/26* (2013.01); *G06F 1/3203* (2013.01); *H04N 2201/0094* (2013.01)

(58) Field of Classification Search
None
See application file for complete search history.

(56) References Cited

U.S. PATENT DOCUMENTS

| 5,752,049 A * | 5/1998 | Lee ........................... B41J 13/00 347/111 |
| 2011/0249285 A1* | 10/2011 | Kobayashi ............ G06F 3/1221 358/1.13 |

(Continued)

FOREIGN PATENT DOCUMENTS

JP 2011-182020 9/2011

*Primary Examiner* — Benny Q Tieu
*Assistant Examiner* — Haris Sabah
(74) *Attorney, Agent, or Firm* — Harness, Dickey & Pierce, P.L.C.

(57) ABSTRACT

An information processing device includes a communication interface, a first energy-saving controller, and a second energy-saving controller. The communication interface is configured to communicate with a host device. The first energy-saving controller is configured to, when a predetermined condition is met, perform energy-saving control on an application and issue a notification of start of energy-saving control. The notification contains a predetermined value representing whether or not the predetermined condition is that a notification of start of transition to an energy-saving mode from the host device has been received. The second energy-saving controller is configured to, after receiving the notification of the start of the energy-saving control from the first energy-saving controller, determine whether to perform energy-saving control based on the predetermined value and perform energy-saving control on hardware including the communication interface based on the result of the determination.

11 Claims, 10 Drawing Sheets

(51) Int. Cl.
*G06F 1/26* (2006.01)
*G06F 1/3234* (2019.01)
G03G 15/00 (2006.01)
G06F 1/3203 (2019.01)
G03G 15/02 (2006.01)

(56) References Cited

U.S. PATENT DOCUMENTS

| | | | |
|---|---|---|---|
| 2013/0222848 A1* | 8/2013 | Oyasato | H04N 1/00896 358/1.15 |
| 2014/0325199 A1 | 10/2014 | Iwasa et al. | |
| 2015/0156364 A1* | 6/2015 | Fujita | H04N 1/00896 358/1.13 |
| 2016/0150115 A1 | 5/2016 | Shibukawa et al. | |

* cited by examiner

FIG.6

| EXPECTATION | VALUE OF MODE AT TIME OF REQUEST | INITIAL DETERMINATION VALUE |
|---|---|---|
| F | F | INDETERMINATE |
| F | T | T |
| T | F | F |
| T | T | INDETERMINATE |

…

INFORMATION PROCESSING SYSTEM ACQUIRE TRANSITION NOTIFICATION FROM HOST DEVICE TO TRANSIT TO ENERGY SAVING MODE

CROSS-REFERENCE TO RELATED APPLICATIONS

The present application claims priority under 35 U.S.C. § 119 to Japanese Patent Application No. 2016-041192, filed on Mar. 3, 2016. The contents of which are incorporated herein by reference in their entirety.

BACKGROUND OF THE INVENTION

1. Field of the Invention

The embodiments discussed herein are directed to an information processing device, an information processing system and a computer program product.

2. Description of the Related Art

Conventionally, a technology is known where an information processing device (such as an operation device) is connected to a host device (such as an image forming apparatus), and instructions and various types of information are transmitted from the information processing device to the host device.

With respect to a host device and an information processing device that are connected to each other, a technology of transition to a mode in which power consumption is deterred in order to reduce the power consumption has been proposed. A technology has been proposed where this mode transition is enabled by both the host device and the information processing device (operational unit), and the host device and the information processing device independently control the mode transition.

When the host device and the information processing device independently perform control to achieve transition to the energy-saving mode, there may be a difference in the energy-saving mode between the host device and the information processing device. Thus, a technology for recovery from the difference occurring in the energy-saving mode has been proposed.

When one device includes multiple configurations for performing energy-saving control in order to control applications and hardware, there may be a situation that cannot be recovered even by using the proposed technology for recovery. This may lower the convenience to users.

SUMMARY OF THE INVENTION

According to one aspect of the present invention, an information processing device includes a communication interface, a first energy-saving controller, and a second energy-saving controller. The communication interface is configured to communicate with a host device. The first energy-saving controller is configured to, when a predetermined condition is met, perform energy-saving control on an application and issue a notification of start of energy-saving control. The notification contains a predetermined value representing whether or not the predetermined condition is that a notification of start of transition to an energy-saving mode from the host device has been received. The second energy-saving controller is configured to, after receiving the notification of the start of the energy-saving control from the first energy-saving controller, determine whether to perform energy-saving control based on the predetermined value and perform energy-saving control on hardware including the communication interface based on the result of the determination.

BRIEF DESCRIPTION OF THE DRAWINGS

FIG. 6 is a diagram exemplifying a determination reference of a sub energy-saving controller according to the embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
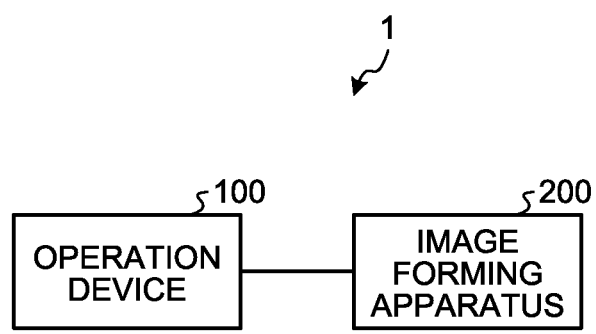
FIG. 1 is a diagram of an exemplary configuration of an information processing system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to provide an information processing device, an information processing system and a computer program product that deter the convenience to users from lowering.

Embodiments of the information processing device, the information processing system and the program will be described in detail below with reference to the accompanying drawings. Note that the following embodiments do not limit the invention. It is possible to combine the embodiments within a range where no discrepancy is caused. An example where the information processing device is used for an operation device will be described; however, the information processing device may be used for another device.

A system configuration of an information processing system according to an embodiment will be described with reference to FIG. 1. FIG. 1 is a diagram of an exemplary system configuration of the information processing system according to the embodiment.

As illustrated in FIG. 1, the information processing system 1 includes an operation device (an example of the information processing device) 100 and an image forming apparatus (an example of the host device) 200.

The case of the embodiment where the operation device 100 and the image forming apparatus 200 are connected via a signal line for serial communications will be described; however, wireless connection using, for example, a local area network (LAN) may be used. The connection does not limit the interface on connection and, instead of the signal line for serial communications, a USB, a serial bus, a wired/wireless LAN, Bluetooth™, IrDA (Infrared Data Association) or WiFi (Wireless Fidelity) may be used. Any communication system may be used as the communication system. For example, I2C communication may be used.

For example, the operation device 100 according to the embodiment is used to receive inputs corresponding to user operations. The operation device 100 is a dedicated device for operating the image forming apparatus 200. The embodiment however does not limit the operation device 100 to the dedicated device. For example, the operation device 100 may be a smartphone or a tablet terminal owned by the user. When the operation device 100 is a smartphone or a tablet terminal, the operation device 100 and the image forming apparatus 200 run independently from each other by using different operating systems (OS).

The example of the embodiment where the image forming apparatus 200 is used as the host device operable by the operation device 100 will be described. The embodiment however does not limit the operable host device to an image forming apparatus. It is satisfactory if the host device is a device operable by the operation device 100.

The image forming apparatus 200 may be an image forming apparatus, such as a multifunction peripheral (MFP) enabling at least two functions of, for example, a copy function, a scanner function, a facsimile function and a printer function.

Figure 2:
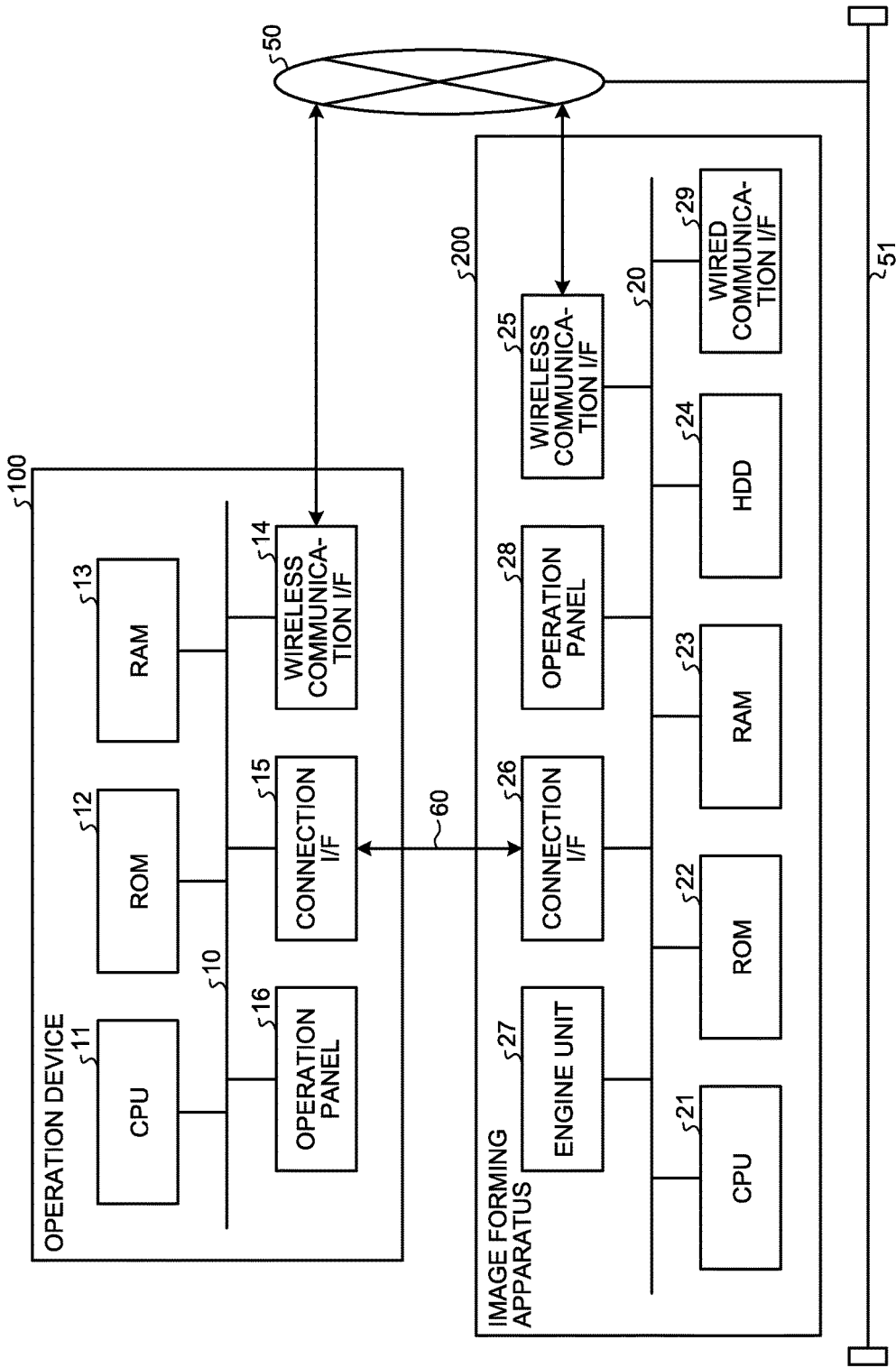
FIG. 2 is a block diagram of an exemplary hardware configuration of an operation device and an image forming apparatus according to the embodiment.

FIG. 2 is a block diagram of an exemplary hardware configuration of the operation device 100 and the image forming apparatus 200 according to the embodiment.

As illustrated in FIG. 2, the operation device 100 includes a central processing unit (CPU) 11, a read only memory (ROM) 12, a random access memory (RAM) 13, a wireless communication I/F 14, a connection I/F 15 and an operation panel 16. The components are connected with one another via an internal bus 10.

The CPU 11 controls the entire operation device 100. The CPU 11 uses the RAM 13 as a work area and executes a program that is stored in, for example, the ROM 12. Accordingly, the CPU 11 implements various functions according to user operations.

The wireless communication I/F 14 serves as an interface for wireless connection and is connected to a wireless communication network 50.

The wireless communication network 50 is, for example, a wireless LAN.

The connection I/F 15 (an example of the second communication interface and the communication interface) is an interface for wired connection and communicates with the image forming apparatus 200 via a communication path 60.

For example, a cable for serial-bus connection may be used for the communication path 60. Alternatively, other connection method may be used.

The operation panel 16 includes a touch screen and a hardware key. The touch screen may be, for example, a liquid crystal display (LCD) with a touch-panel function or an organic electro luminescence display device.

The image forming apparatus 200 includes a CPU 21, a ROM 22, a RAM 23, a hard disk drive (HDD) 24, a wireless communication I/F 25, a connection I/F 26, an engine unit 27, an operation panel 28, and a wired communication I/F 29. The components are connected with one another via an internal bus 20.

The CPU 21 controls the entire image forming apparatus 200. The CPU 21 uses the RAM 23 as a work area and executes a program that is stored in, for example, the ROM 22 or the HDD 24. Accordingly, in response to user operations and received instructions, the CPU 21 implements the above-described various functions, such as the copy function, the scanner function, the facsimile function and the printer function, and various functions to be described below.

The wireless communication I/F 25 serves an interface for wireless connection and is connected to the wireless communication network 50.

The connection I/F 26 (an example of the first communication interface) is an interface for wired connection and is an interface for communicating with the operation device 100 via the communication path 60.

The engine unit 27 is, for example, an image forming engine and is, for example, a black-white plotter, a drum color plotter, a scanner or a facsimile unit. The operation panel 28 has a touch screen and hardware keys. The operation panel 28 may be a display device for displaying a screen.

The wired communication I/F 29 serves as an interface for wired connection and is connected to a LAN 51.

In the embodiment, the operation device 100 may be detachable from the image forming apparatus 200. Furthermore, a multifunction peripheral having an information processing system that is a combination of the operation device 100 and the image forming apparatus 200 may be used.

The operation device 100 and the image forming apparatus 200 of the embodiment are communicable with each other. The case of the embodiment will be described where the operation device 100 and the image forming apparatus 200 communicate with each other via the communication path 60 for serial communications and the wireless communication network 50. Alternatively, another communication method maybe used. For example, serial communications, a wired LAN or Bluetooth™ may be used for another communication method regardless of communication standards.

Figure 3:
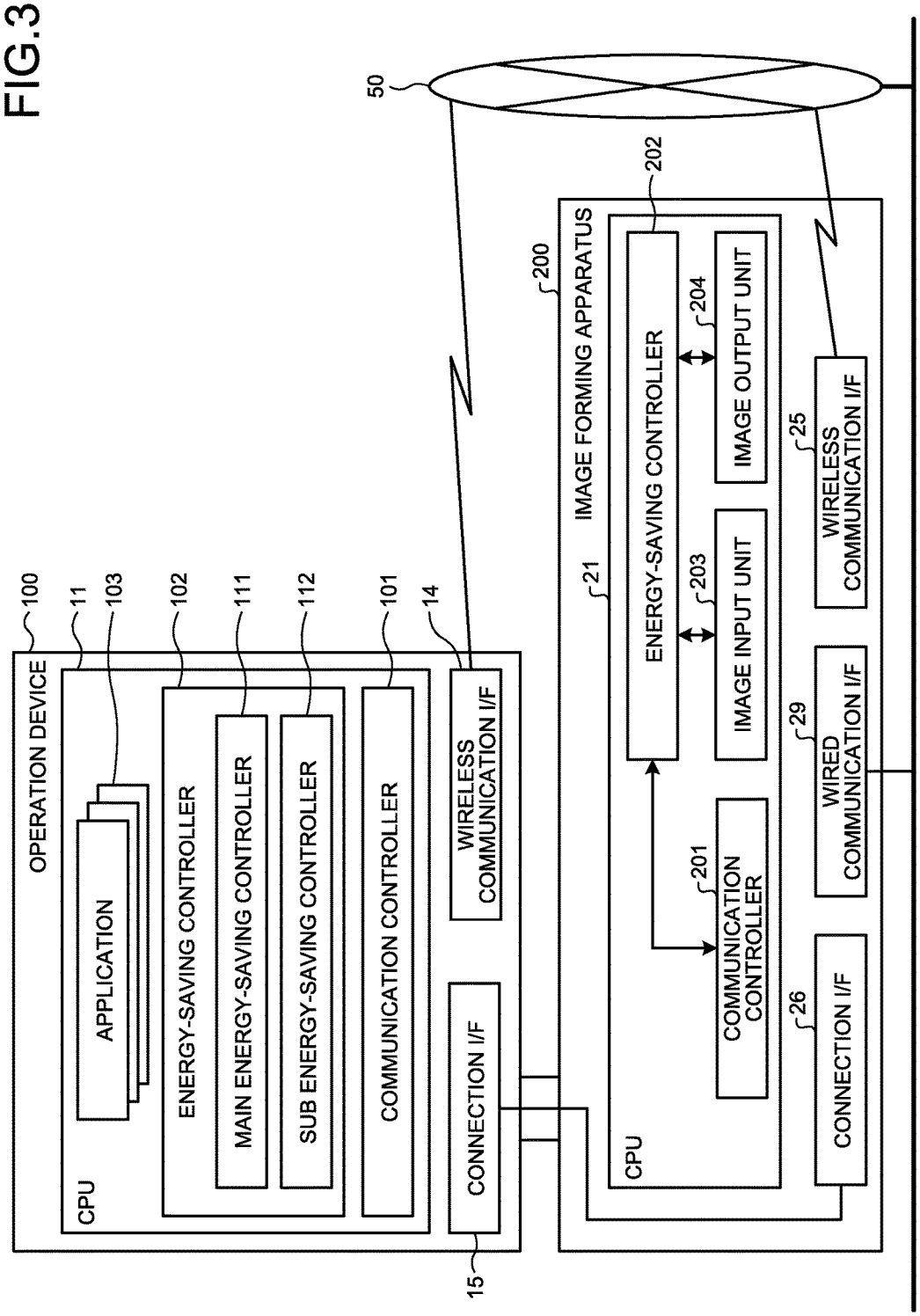
FIG. 3 is a block diagram of an exemplary configuration of the operation device and the image forming apparatus according to the embodiment.

FIG. 3 is a block diagram of an exemplary configuration of the operation device 100 and the image forming apparatus 200 according to the embodiment.

In the example illustrated in FIG. 3, the CPU 21 executes the program that is stored in the ROM 22 and accordingly the image forming apparatus 200 implements a communication controller 201, an energy-saving controller 202, an image input unit 203 and an image output unit 204.

The communication controller 201 controls communication of information with other devices including the operation device 100 via the connection I/F 26, the wireless communication I/F 25 and the wired communication I/F 29.

The image input unit 203 performs a process of inputting image data to the image forming apparatus 200.

The image output unit 204 performs a process of outputting image data from the image forming apparatus 200 and image printing process.

The energy-saving controller (an example of the host energy-saving controller) 202 perform energy-saving control on the entire image forming apparatus 200. For example, the energy-saving controller 202 performs energy-saving control on the entire image forming apparatus 200 according to the process mode of the image input unit 203 and the image output unit 204.

For example, when the energy-saving controller 202 starts the energy-saving control, the communication controller 201 notifies the operation device 100 of the start of transition to the energy-saving mode via the connection I/F 26.

Furthermore, the communication controller 201 notifies the operation device 100 of information indicating the current energy-saving mode via the connection I/F 26 in response to a request from the operation device 100 requiring a response on whether the image forming apparatus 200 has transitioned to the energy-saving mode.

The CPU 11 executes the program that is stored in the ROM 12 and accordingly the operation device 100 implements a communication controller 101, an energy-saving controller 102 and an application 103.

The communication controller 101 controls communications of information with other devices including the image forming apparatus 200 via the connection I/F 15 and the wireless communication I/F 14.

The energy-saving controller 102 includes a main energy-saving controller 111 and a sub energy-saving controller 112 and performs energy-saving control on the entire operation device 100.

The main energy-saving controller 111 (an example of the first energy-saving controller) has a configuration for controlling upper layers and, for example, makes adjustments on energy-saving with the application 103.

When a given condition is met, the main energy-saving controller 111 performs energy-saving control on the application 103 and issues, to the sub energy-saving controller 112, a notification of start of energy-saving control that contains a predetermined value representing whether or not the predetermined condition is that a notification of start of transition to the energy-saving mode from the image forming apparatus 200 has been received.

In the embodiment, the predetermined condition is that a notification of start of transition to the energy-saving mode from the image forming apparatus 200 has been receive or that a predetermined time during which the control is not performed elapses. Alternatively, another condition may be used.

When the notification of start of transition to the energy-saving mode from the image forming apparatus 200 is received, a notification is issued to the sub energy-saving controller 112. The notification contains an expectation 'F' which is a value representing that a notification of start of transition to the energy-saving mode from the image forming apparatus 200 has been received.

When the case where the predetermined time during which the control is not performed elapses, a notification is issued to the sub energy-saving controller 112. The notification contains an expectation 'T' which is a value representing that a notification of start of transition to the energy-saving mode from the image forming apparatus 200 has been received.

The sub energy-saving controller 112 (an example of the second energy-saving controller) has a configuration to control lower layers and performs energy-saving control on hardware including the operation panel 16 of the operation device 100.

For example, after receiving the notification of the start of the energy-saving control, the sub energy-saving controller 112 determines whether to start the energy-saving control based on the expectation and, according to the result of the determination, performs energy-saving control on the hardware including the connection I/F 15. In the embodiment, the determination is made based on not only the expectation but also the value of the mode at the time of request. The value of the mode at the time of request will be described later.

When the sub energy-saving controller 112 receives information indicating the energy-saving mode of the image forming apparatus 200 from the image forming apparatus 200 after receiving the notification of the start of the energy-saving control, the sub energy-saving controller 112 determines whether to perform energy-saving control based on the received information representing the energy-saving mode. Accordingly, it is possible to deter occurrence of a difference from the image forming apparatus 200 in the energy-saving mode.

The sub energy-saving controller 112 performs control to recover the operation device 100 from the energy-saving mode when a recovery signal indicating that the image forming apparatus 200 has recovered from the energy-saving mode from the image forming apparatus 200 or an input of a recovery command issued by a user operation.

Even after determining to perform the energy-saving control, the sub energy-saving controller 112 performs recovery control when a notification of recovery from the energy-saving mode is issued from the image forming apparatus 200. Accordingly, it is possible to deter a difference in the energy-saving mode.

The application 103 has a user interface and displays a screen on the operation panel 16 and receives operation settings from the user via the operation panel 16. The application 103 may provide services using the various functions of the image forming apparatus 200, such as the copy function, the scanner function, the facsimile function and the printer function. The application 103 may be multiple applications including an application that use only the operation panel 16, an application that use only the image forming apparatus 200, and an application that uses both the operation panel 16 and the image forming apparatus 200.

The embodiment exemplifies the case where the operation device 100 includes the energy-saving controller 102 and the image forming apparatus 200 includes the energy-saving controller 202. The energy-saving controllers (the energy-saving controller 102 and the energy-saving controller 202) exist in both the operation device 100 and the image forming apparatus 200 and the energy-saving controllers make inquiries to the applications installed respectively in the operation device 100 and the image forming apparatus 200 to independently manage the energy-saving modes. The energy-saving controller 102 of the operation device 100 may run in association with the energy-saving mode of the image forming apparatus 200.

Figure 4:
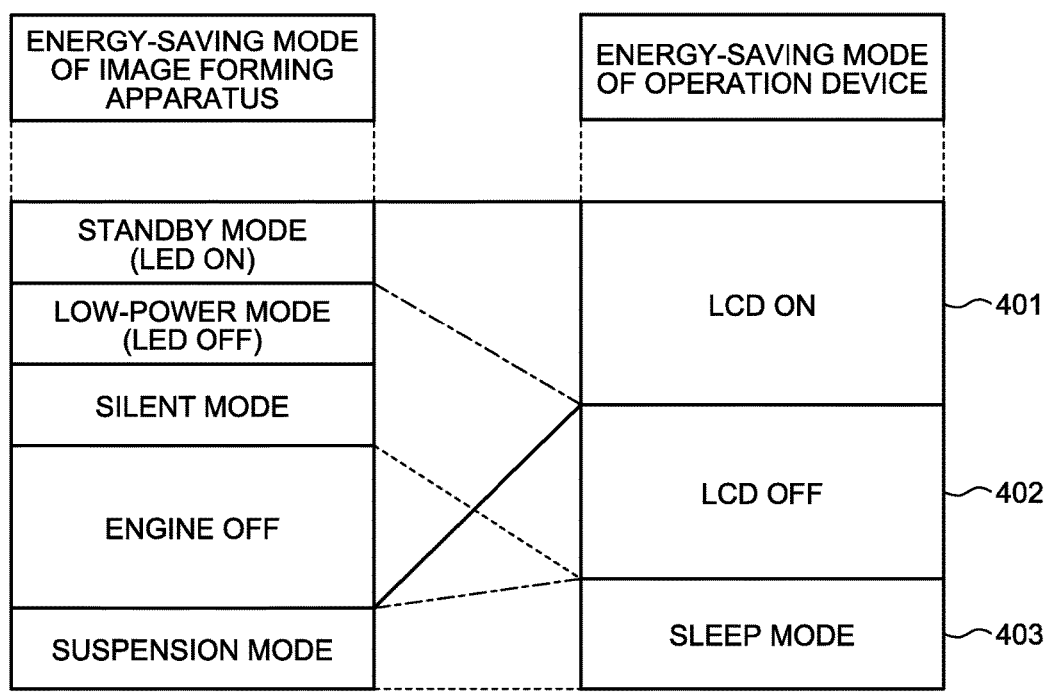
FIG. 4 is a diagram exemplifying a corresponding relationship in the energy-saving mode between the operation device and the image forming apparatus according to the embodiment.

FIG. 4 is a diagram exemplifying a corresponding relationship in the energy-saving mode between the operation device 100 and the image forming apparatus 200 according to the embodiment.

As illustrated in FIG. 4, when the LCD used for the operation panel 16 of the operation device is in an LCD-on mode 401; the image forming apparatus 200 is in a stand-by mode, a lower-power mode, a silent mode, or an engine-off mode. When the LCD is in an LCD-off mode 402; the image forming apparatus 200 is in the low-power mode, the silent mode, or the engine-off mode. When the LCD is in a sleep mode 403; the image forming apparatus 200 is in a suspension mode.

In other words, when the image forming apparatus 200 transitions to the engine-off mode or the suspension mode, the operation device 100 also needs to transition to the sleep mode 403. When the image forming apparatus 200 transitions to the standby mode (LED-on), the operation device 100 also needs to transition to the LCD-on mode 401.

In this manner, it is necessary to perform control such that no different occurs in the energy-saving mode between the operation device 100 and the image forming apparatus 200.

Figure 5:
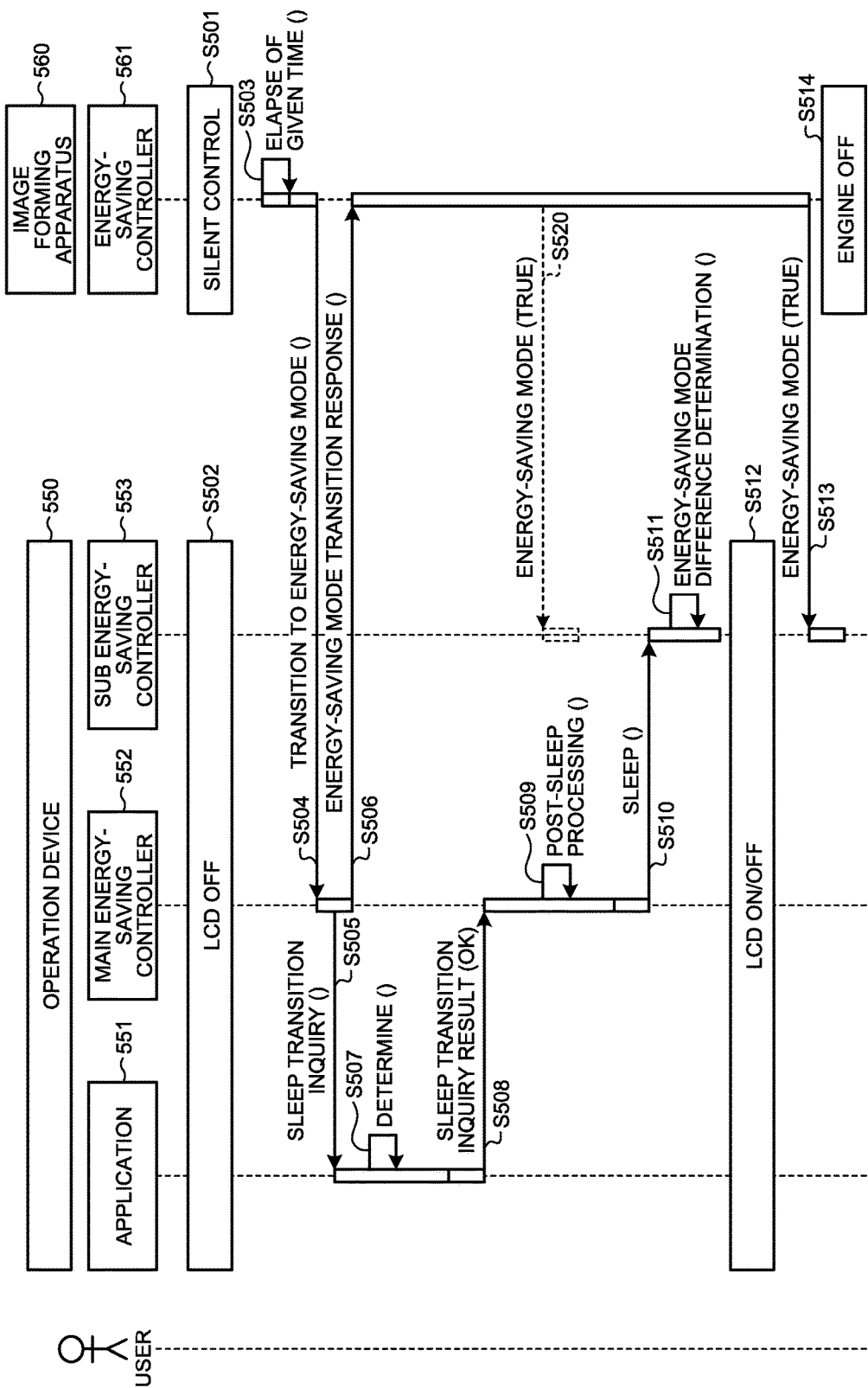
FIG. 5 is a sequence chart of conventional control between the operation device and the image forming apparatus.

FIG. 5 is a sequence chart of conventional control between an operation device 550 and an image forming apparatus 560. The case will be exemplified where the process flow is as that of the conventional control and the operation device 550 includes a main energy-saving controller 552 and a sub energy-saving controller 553 as in the embodiment and the image forming apparatus 560 includes an energy-saving controller 561.

In this case, the energy-saving controller 561 of the image forming apparatus 560 performs control to place the image forming apparatus 560 in the silent mode (step S501) and the operation device 550 performs control to place an LCD used for the operation panel of the operation device 550 in the LCD-off mode (step S502).

It is assumed that it is determined that no process is performed in the image forming apparatus 560 and a given time elapses (step S503). According, the energy-saving controller 561 of the image forming apparatus 560 issues a notification indicating that transition to the energy-saving mode (for example, the engine-off mode) is to be started to the operation device 550 via a connection I/F (step S504).

On receiving that notification, the main energy-saving controller 552 of the operation device 550 makes a sleep transition inquiry to an application 551 that is an upper layer (step S505). In this manner, the operation device 550 starts transition to the sleep mode corresponding to the engine-off mode of the image forming apparatus 560. The main energy-saving controller 552 then makes a response indicating that the transition to the energy-saving mode (for example, the engine-off mode) has been received to the image forming apparatus 560 via the connection I/F (step S506).

The application 551 of the operation device 550 determines whether it is possible to transition to the sleep mode (step S507). The sequence chart exemplifies the case where it is possible to transition to the sleep mode. The application 551 notifies the main energy-saving controller 552 of the result of the inquiry indicating that it is possible to transition to the sleep mode (step S508).

The main energy-saving controller 552 of the operation device 550 then considers that preparation of the application 551 to transition to the sleep mode has completed and performs post-sleep processing for upper layers including the application 551 (step S509). The main energy-saving controller 552 then transmits, to the sub energy-saving controller 553, an instruction to enter the sleep mode (step S510).

After receiving the instruction to enter the sleep mode, the sub energy-saving controller 553 determines whether a difference from the image forming apparatus 560 occurs in the energy-saving mode (step S511). Normally, after the transmission of a notification of the start of the process to transition to the energy-saving mode (for example, the engine-off mode) at step S502, the image forming apparatus 560 issues, just before transitioning to the energy-saving mode (such as the engine-off mode), a notification indicating that the image forming apparatus 560 has completed transition to the energy-saving mode. For example, this notification is issued at step S520 in FIG. 5. Accordingly, the image forming apparatus 560 has transitioned to the energy-saving mode (for example, the engine-off mode) at the time when it is determined whether a difference occurs in the energy-saving mode, and thus it is possible to determine that a different does not occur in the energy-saving mode even when the operation device 550 transitions to the sleep mode.

When the process of transition to the energy-saving mode delays in the image forming apparatus 560 and accordingly it is not possible to receive the notification before determination on the difference, however, the sub energy-saving controller 553 is not able to recognize that the image forming apparatus 560 is transitioning to the engine-off mode.

Specifically, there are two cases as the case where the notification of completion of transition to the energy-saving mode (for example, the engine-off mode) has not received. One of the cases is that the process of the image forming apparatus 560 to transition to the energy-saving mode delays and the other case is that, regardless whether the process of the image forming apparatus 560 to transition to the energy-saving mode has ended, the image forming apparatus 560 has recovered from the energy-saving mode.

While the operation device 550 may transition to the sleep mode when the process of the image forming apparatus 560 to transition to the energy-saving mode delays, the operation device 550 has to perform LCD-on control when the image forming apparatus 560 is recovering from the energy-saving mode.

In the example illustrated in FIG. 5, the operation device 550 does not receive a notification indicating that the image forming apparatus 560 has transitioned to the energy-saving mode from the image forming apparatus 560 and thus determines that the image forming apparatus 560 has recovered and performs the LCD-on control (step S512). In the example illustrated in FIG. 5, however, the process of the image forming apparatus 560 to transition to the energy-saving mode delays and thus it is not preferable to perform the LCD-on control. Then, after the LCD-on control, the image forming apparatus 560 to transition to the engine-off mode at step S514 issues, to the sub-energy-saving controller 553, a notification just before the transition to the energy-saving mode (for example, the engine-off mode) (step S513).

As such, in the example represented in FIG. 5, when the operation device 550 includes the main energy-saving controller 552 and the sub energy-saving controller 553 for control, the energy-saving control is not necessarily performed properly.

Thus, the operation device 100 and the image forming apparatus 200 of the embodiment implement control that does not cause a difference in the energy-saving mode.

The sub energy-saving controller 112 of the embodiment determines whether a difference occurs in the energy-saving mode based on a determination value that is set in consideration of the energy-saving mode of the image forming apparatus 200, etc. First of all, setting of an initial value of the determination value (hereinafter, "initial determination value") will be described.

FIG. 6 is a diagram exemplifying a reference of setting the initial determination value performed by the sub energy-saving controller 112 of the embodiment. As illustrated in FIG. 6, an expectation representing whether a notification of start of transition to the energy-saving mode from the image forming apparatus 200 has been received, a mode at the time of request representing the energy-saving mode of the image forming apparatus 200 at the time of start of difference detection, and a determination value representing whether the energy-saving mode differs are associated with one another.

The expectation represents whether the image forming apparatus 200 issues, at the time of start of the detection, a notification of start of transition to the energy-saving mode. When the notification is issued, the expectation is "F" (false). When a given time during which the operation device 100 does not perform the control elapses, i.e., when the image forming apparatus 200 does not issue a notification of start of transition to the energy-saving mode at the time of the detection but wants to transition to the energy saving mode, the expectation is "T" (true).

The value of the mode at the time of request represents the energy-saving mode of the image forming apparatus 200 at the time when the main energy-saving controller 111 requests the sub energy-saving controller 112 to start detection. When the image forming apparatus 200 is transitioning to the energy-saving mode, the mode value at the time of request is "T" (true). When the image forming apparatus 200 is not transitioning to the energy-saving mode, the mode value at the time of request is "F" (false).

The initial determination value is the initial value of the determination value to determine whether the energy-saving mode differs. The initial determination value associated with the expectation "F" and the value of the mode at the time of request "F" are "indeterminate" because it is considered that the image forming apparatus 200 is under the transition process or has ended the transition process. The initial determination value associated with the expectation "F" and the value of the mode at the time of request "T" is "T" because it is considered that the process of the image forming apparatus 200 has ended. The initial determination value associated with the expectation "T" and the value of the mode at the time of request "F" is "F" because it is considered that the image forming apparatus 200 has recovered. The initial determination value associated with the expectation "T" and the value of the mode at the time of request "T" is "indeterminate" because there is a possibility that the image forming apparatus 200 is in the energy-saving mode or recovery from the energy-saving mode occurs.

In the embodiment, for example, the sub energy-saving controller 112 holds the table representing the determination reference illustrated in FIG. 6 and determines whether a difference occurs in the energy-saving mode according to the initial determination value or the determination value updated afterwards.

Figure 7:
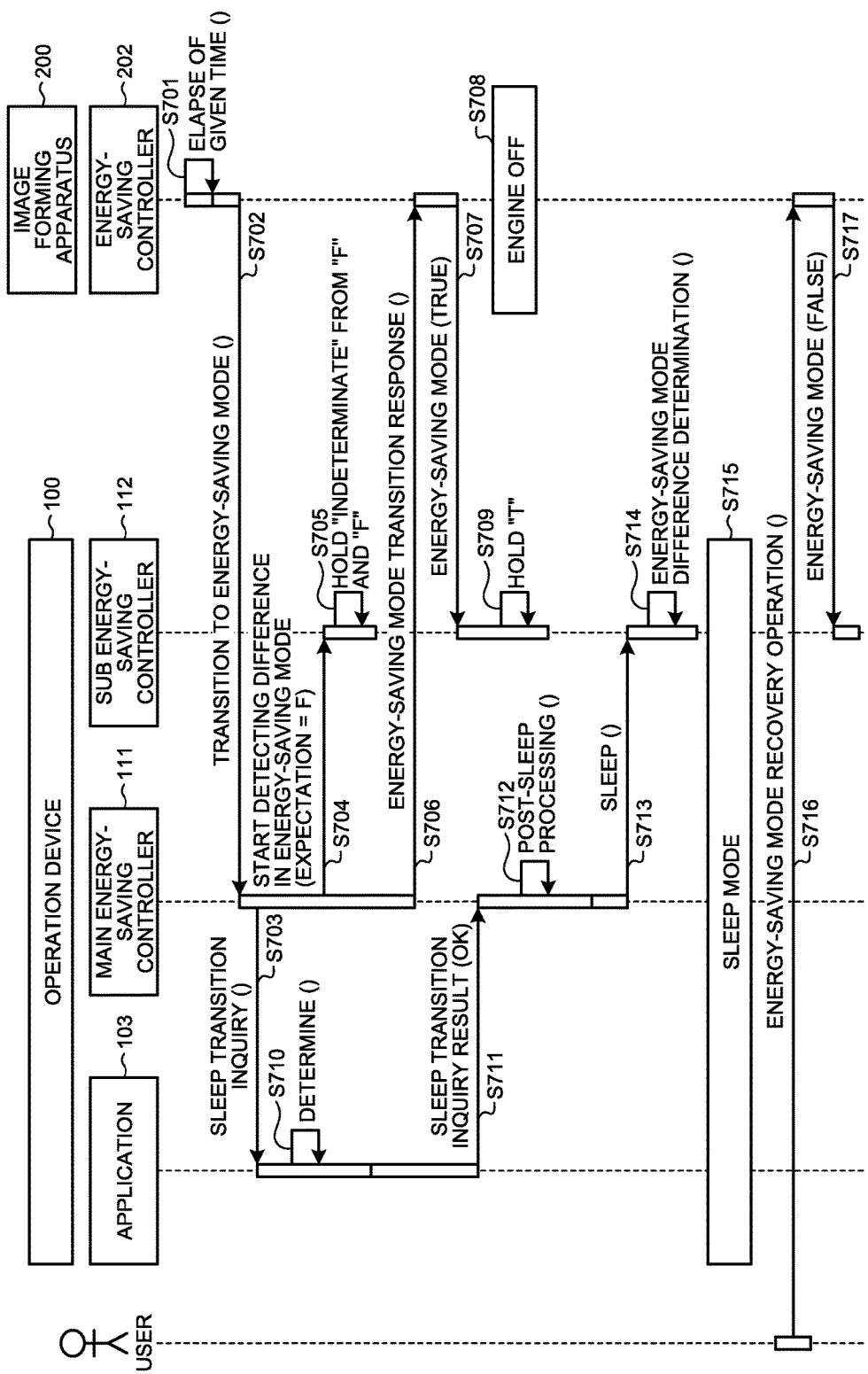
FIG. 7 is a sequence chart exemplifying a process of the operation device to transition to an energy-saving mode according to the embodiment.

FIG. 7 is a sequence chart exemplifying a process of the operation device 100 to transition to the energy-saving mode according to the embodiment.

First of all, in the image forming apparatus 200, no process is performed and the given time elapses (step S701). Accordingly, the energy-saving controller 202 of the image forming apparatus 200 issues, to the operation device 100 via the connection I/F 26, a notification indicating that the image forming apparatus 200 is to start control to transition to the energy-saving mode (such as the engine-off mode) (step S702). The given time (an example of the predetermined time) is determined according to the embodiment as a time to transition to the energy-saving mode.

On receiving the notification, the main energy-saving controller 111 of the operation device 100 makes a sleep transition inquiry to the application 103 that is an upper layer (step S703). In this manner, the operation device 100 starts transition to the sleep mode corresponding to the engine-off mode of the image forming apparatus 200.

The main energy-saving controller 111 makes the inquiry and issues a notification of start of detection of a difference in the energy-saving mode to the sub energy-saving controller 112 (step S704). In the sequence chart, the notification of start of detection of a difference in the energy-saving mode contains the expectation "F" representing that the image forming apparatus 200 issues a notification of start of transition to the energy-saving mode.

The sub energy-saving controller 112 receives the notification and the expectation "F" and accordingly considers that the image forming apparatus 200 is transitioning to the energy-saving mode and specifies that the value of the mode at the time of request is "F". In other words, at the time of the request to transition to the energy-saving mode, "F" representing that the image forming apparatus 200 has not transitioned to the energy-saving mode is set for the value of the mode at the time of request.

From the expectation "F" and the value "F" of the mode at the time of request, the sub energy-saving controller 112 holds the initial determination value "indeterminate" (step S705). During the period from the start of detection of a difference (step S704) to reception of an instruction for the sleep mode (for example, step S713) (i.e., during the period of detection), the sub energy-saving controller 112 monitors the energy-saving mode of the image forming apparatus 200 by holding the determination value.

The main energy-saving controller 111 further transmits a response representing that the operation device 100 is to transition to the energy-saving mode (for example, the sleep mode) to the image forming apparatus 200 via the communication controller 101 (step S706).

The energy-saving controller 202 of the image forming apparatus 200 then notifies the operation device 100 of the parameter "T" (true) indicating completion of the transition to the energy-saving mode (step S707). Accordingly, the image forming apparatus 200 transitions to the engine-off mode that is the energy-saving mode (step S708).

The sub energy-saving controller 112 of the operation device 100 receives the parameter (true) indicating completion of the transition to the energy-saving mode from the image forming apparatus 200 and thus holds the determination value "T" (step S709).

In response to the inquiry at step S703, the application 103 of the operation device 100 determines whether it is possible to transition to the sleep mode (step S710). The sequence chart exemplifies the case where it is possible to transition to the sleep mode. The application 103 notifies the main energy-saving controller 111 of the result of the inquiry indicating that it is possible to transition to the sleep mode (step S711).

The main energy-saving controller 111 of the operation device 100 then considers that the application 103 has completed the preparation for transition to the sleep mode and performs the post-sleep processing for upper layers including the application 103 (step S712). The main energy-saving controller 111 then transmits an instruction to enter the sleep mode to the sub energy-saving controller 112 (step S713).

After receiving the instruction to enter the sleep mode, the sub energy-saving controller 112 determines whether there is a difference from the image forming apparatus 200 in the energy-saving mode (step S714). The sub energy-saving controller 112 holds the determination value "T" and thus considers that the image forming apparatus 200 has completed transition to the energy-saving mode. The sub energy-saving controller 112 determines that no difference will occur even when the operation device 100 transitions to the energy-saving mode (for example, the sleep mode). Thus, the operation device 100 transitions to the sleep mode (step S715).

In the embodiment, when the determination value is "T", it can be considered that the image forming apparatus 200 has completed transition to the energy-saving mode. When the determination value is "indeterminate", the sub energy-saving controller 112 is able to determine that a delay occurs in transition of the image forming apparatus 200 to the energy-saving mode. Also in this case, the operation device 100 is able to transition to the sleep mode. As described above, in the embodiment, determination based on the determination value implements control for transition to the energy-saving mode even when a delay occurs in the transition of the image forming apparatus 200.

When the image forming apparatus 200 receives a user's operation to cause the image forming apparatus 200 to recover from the energy-saving mode (step S716), the energy-saving controller 202 of the image forming apparatus 200 transmits (false) indicating that the energy-saving mode has ended to the sub energy-saving controller 112 of the operation device 100 (step S717). Accordingly, the sub energy-saving controller 112 performs control for transition to the LCD-on mode. The following descriptions on the control will be omitted.

FIG. 7 exemplifies the case where the image forming apparatus 200 does not recover until the transition to the sleep mode; however, there is a case where the user causes the image forming apparatus 200 to recover before the transition to the sleep mode. The case where the user causes the image forming apparatus 200 to recover before the transition to the sleep mode will be described.

Figure 8:
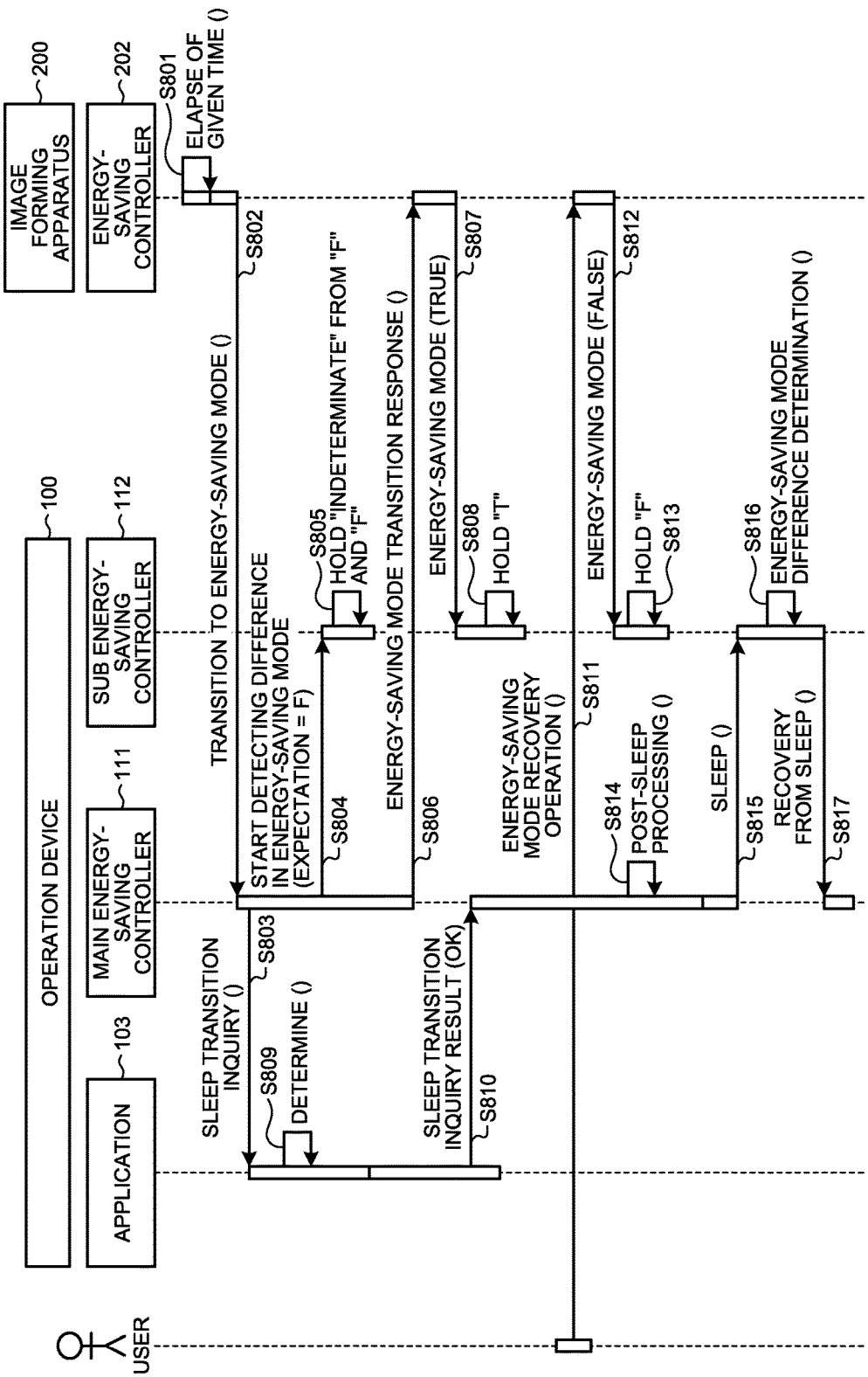
FIG. 8 is a sequence chart exemplifying a process performed in a case where the image forming apparatus recovers before the operation device transitions to the energy-saving mode according to the embodiment.

FIG. 8 is a sequence chart exemplifying a process performed in a case where the image forming apparatus 200 recovers until the operation device 100 transitions to the energy-saving mode according to the embodiment.

In the process procedure illustrated in FIG. 8, according to the same process procedure as that from S701 to S707 and S709 to S711, the process to notification issued by the application 103 indicating the inquiry result representing that it is possible to transition to the sleep mode to the main energy-saving controller 111 is performed (steps S801 to S810).

When the image forming apparatus 200 receives a user's operation to cause the image forming apparatus 200 to recover from the energy-saving mode (step S811), the energy-saving controller 202 of the image forming apparatus 200 transmits a parameter (false) indicating that the image forming apparatus 200 has recovered from the energy-saving mode to the sub energy-saving controller 112 of the operation device 100 (step S812).

The sub energy-saving controller 112 of the operation device 100 receives a parameter (false) indicating that the image forming apparatus 200 has recovered from the energy-saving mode from the image forming apparatus 200 and thus holds the determination value "F" (step S813).

The main energy-saving controller 111 of the operation device 100 considers that the application 103 has completed the preparation for transition to the sleep mode and performs the post-sleep processing for upper layers including the application 103 (step S814). The main energy-saving controller 111 then transmits an instruction to enter the sleep mode to the sub energy-saving controller 112 (step S815).

After receiving the instruction to enter the sleep mode, the sub energy-saving controller 112 determines whether a difference from the image forming apparatus 200 occurs in the energy saving mode (step S816). The sub energy-saving controller 112 holds the determination value "F" and thus considers that the image forming apparatus 200 has recovered from the energy-saving mode and determines whether a difference from the operation device 100 occurs in the energy-saving mode. According to the sequence chart, it is determined that a difference occurs in the energy-saving mode between the image forming apparatus 200 having recovered and the operation device 100 to transition to the sleep mode. Thus, the sub energy-saving controller 112 transmits an instruction to recover from the sleep mode to the main energy-saving controller 111 (step S817).

FIGS. 7 and 8 illustrate the case where the image forming apparatus 200 issues the notification of the start of transition to the energy-saving mode (the case where the expectation is "F"). According to the examples illustrated in FIGS. 7 and 8, a setting is made where the initial determination value is "indeterminate". Thus, the sub energy-saving controller 112 is able to recognize that the image forming apparatus 200 is transitioning to the energy-saving mode. Thus, even when a delay occurs in the transition of the image forming apparatus 200 to the energy-saving mode, it is possible to cause the operation device 100 to transition to the sleep mode.

In the embodiment, the process performed by the operation device 100 to transition to the energy-saving mode is not limited to the case where the notification is received. A process performed by the operation device 100 when no process is performed and a given time elapses (the case where the expectation is "T") will be described.

Figure 9:
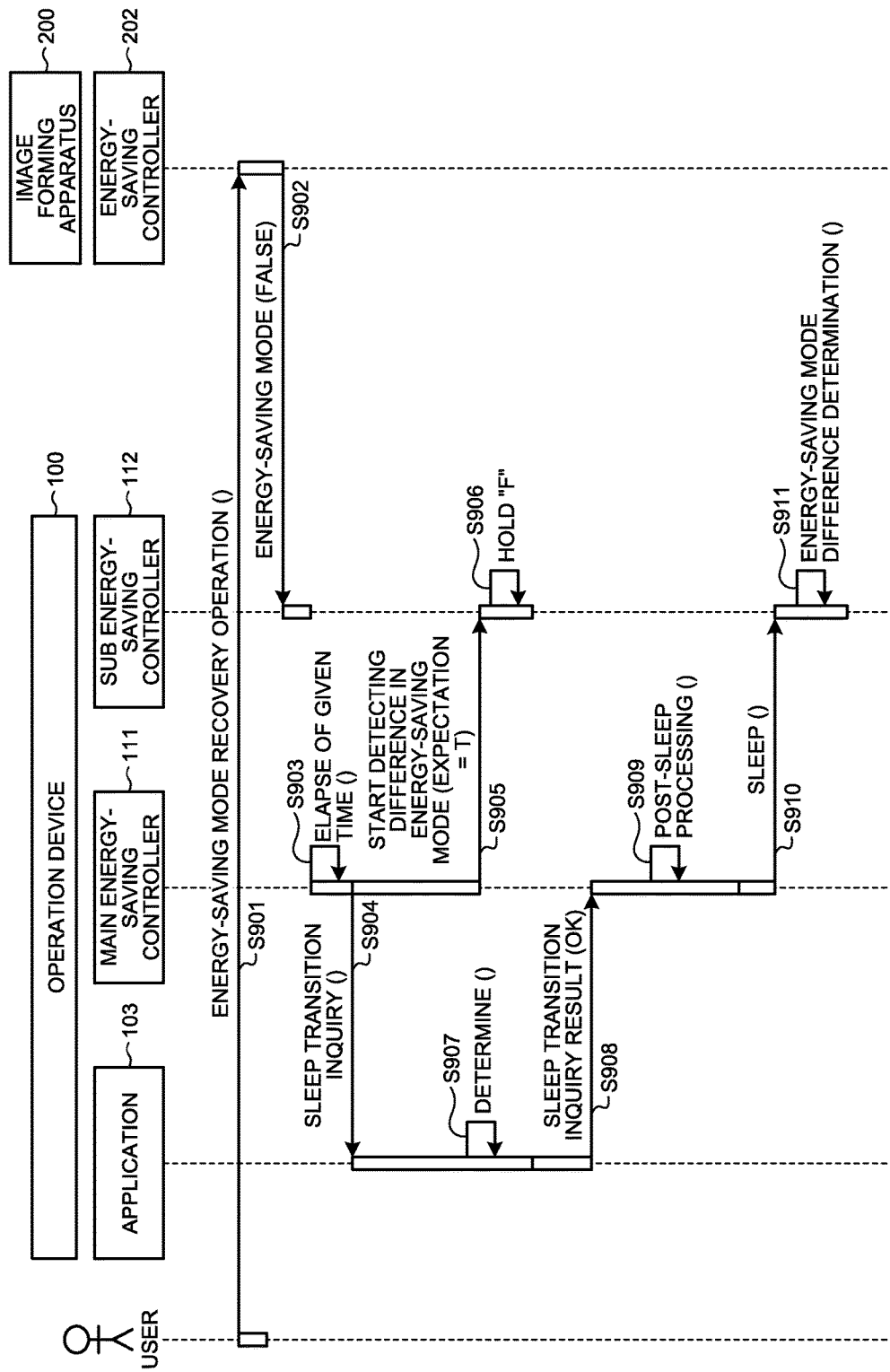
FIG. 9 is a sequence chart exemplifying a process performed in a case where a recovery operation is performed on the image forming apparatus when the operation device starts a process of transition to the energy-saving mode according to the embodiment.

FIG. 9 is a sequence chart exemplifying the process performed in a case where a recovery operation is performed on the image forming apparatus when the operation device 100 starts the process to transition to the energy-saving mode according to the embodiment.

First of all, the image forming apparatus 200 receives a user's operation to cause the image forming apparatus 200 to recover from the energy-saving mode (step S901), the energy-saving controller 202 of the image forming apparatus 200 transmits a parameter (false) indicating that the energy-saving mode has ended to the sub energy-saving controller 112 of the operation device 100 (step S902). Accordingly, the sub energy-saving controller 112 holds the value "F" of the mode at the time of request until the given time elapses. The given time during which the value "F" of the mode at the time of request is held is a value that is determined according to the embodiment.

It is assumed that the main energy-saving controller 111 of the operation device 100 determines that no process is performed and the given time elapses (step S903).

The main energy-saving controller 111 of the operation device 100 makes a sleep transition inquiry to the application 103 that is a upper layer (step S904). In this manner, the operation device 100 starts transition to the sleep mode corresponding to the elapse of the given time.

The main energy-saving controller 111 makes the inquiry and issues a notification of start of detection of a difference in the energy-saving mode to the sub energy-saving controller 112 (step S905). According to the sequence chart, the notification of start of detection of a difference in the energy-saving mode contains the expectation "T" (true) corresponding to a case where a given time during which the operation device 100 does not perform the control elapses.

The sub energy-saving controller 112 holds the expectation "T" and the value "F" of the mode at the time of request. From the expectation "T" and the value "F" of the mode at the time of request, the sub energy-saving controller 112 holds the initial determination value "F" as the determination value (step S906). During the period from the start of detection of a difference (step S905) to reception of an instruction for the sleep mode (for example, step S910), i.e., during the period of detection, the sub energy-saving controller 112 monitors the energy-saving mode of the image forming apparatus 200 by holding the determination value.

On the other hand, in response to the inquiry at step S904, the application 103 of the operation device 100 determines whether it is possible to transition to the sleep mode (step S907). The sequence chart exemplifies the case where it is possible to transition to the sleep mode. The application 103 notifies the main energy-saving controller 111 of the result of the inquiry indicating that it is possible to transition to the sleep mode (step S908).

The main energy-saving controller 111 of the operation device 100 then performs the post-sleep processing for upper layers including the application 103 (step S909). The main energy-saving controller 111 then transmits an instruction to enter the sleep mode to the sub energy-saving controller 112 (step S910).

After receiving the instruction to enter the sleep mode, the sub energy-saving controller 112 determines whether there is a difference from the image forming apparatus 200 in the energy-saving mode (step S911). The sub energy-saving controller 112 holds the determination value "F" and thus determines that there is a difference from the image forming apparatus 200 in the energy-saving mode. Thus, the operation device 100 performs recovery control, such as the LCD-on control.

Figure 10:
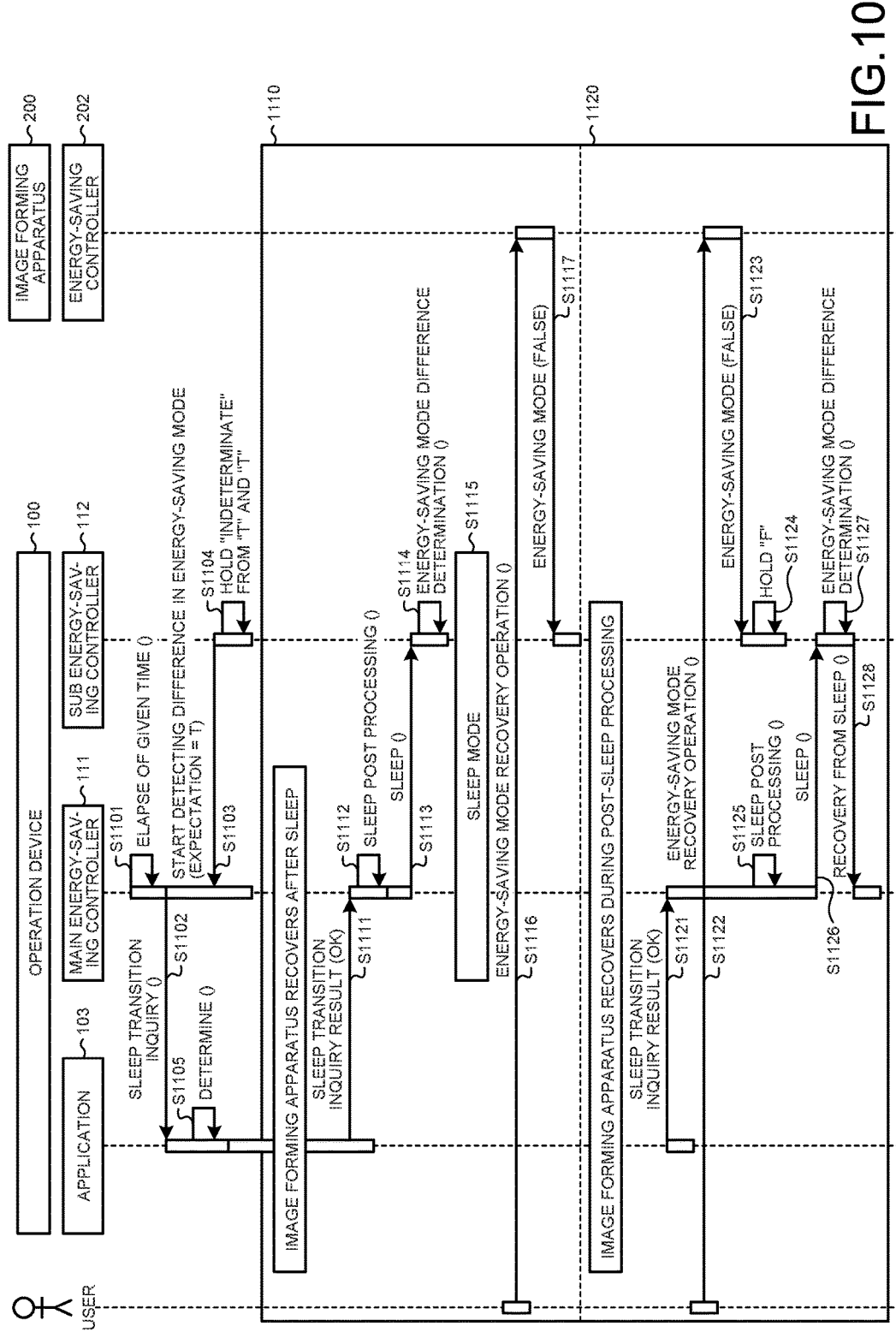
FIG. 10 is a sequence chart exemplifying a process performed when the operation device starts the process of transition to the energy-saving mode.

FIG. 10 is a sequence chart exemplifying a process performed when the operation device 100 starts the process to transition to the energy-saving mode according to the embodiment. FIG. 10 exemplifies a case 1110 where the image forming apparatus 200 recovers after the sleep and a case 1120 where the image forming apparatus 200 recovers during the post-sleep processing.

First of all, it is assumed that the main energy-saving controller 111 of the operation device 100 determines that no process has been performed and the given time elapses (step S1101).

The main energy-saving controller 111 of the operation device 100 makes a sleep transition inquiry to the application 103 that is an upper layer (step S1102). In this manner, the operation device 100 starts transition to the sleep mode corresponding to the elapse of the given time.

The main energy-saving controller 111 makes the inquiry and issues a notification of start of detection of a difference in the energy-saving mode to the sub energy-saving controller 112 (step S1103). According to the sequence chart, the notification of start of detection of a difference in the energy-saving mode contains the expectation "T" (true) corresponding to a case where a given time during which the operation device 100 does not perform the control elapses.

In the case where the sub energy-saving controller 112 receives the expectation "T" together with the notification, unless the sub energy-saving controller 112 has not received a parameter (false) indicating that the energy-saving mode has ended even when the given time elapses, the sub energy-saving controller 112 assumes that the image forming apparatus 200 has already transitioned to the energy-saving mode (for example, the engine-off mode) and thus makes a setting where the value of the mode at the time of request is "T". From the expectation "T" and the value "T" of the mode at the time of request, the sub energy-saving controller 112 holds the initial determination value "indeterminate" as the determination value (step S1104). During the period from the start of detection of a difference (step S1103) to reception of an instruction for the sleep mode (for example, step S1113 or S1126), i.e., during the period of detection, the sub energy-saving controller 112 monitors the energy-saving mode of the image forming apparatus 200 by holding the determination value.

First of all, the case 1110 where the image forming apparatus 200 recovers after the sleep will be described. The application 103 notifies the main energy-saving controller 111 of the result of the inquiry indicating that it is possible to transition to the sleep mode (step S1111).

The main energy-saving controller 111 of the operation device 100 then performs the post-sleep processing for upper layers including the application 103 (step S1112). The main energy-saving controller 111 then transmits an instruction to enter the sleep mode to the sub energy-saving controller 112 (step S1113).

After receiving the instruction to enter the sleep mode, the sub energy-saving controller 112 determines whether there is a difference from the image forming apparatus 200 in the energy-saving mode (step S1114). The sub energy-saving controller 112 holds the determination value "indeterminate" and thus considers that no difference from the image forming apparatus 200 occurs in the energy-saving mode. Thus, the operation device 100 transitions to the sleep mode (step S1115).

The image forming apparatus 200 receives a user's operation to cause the image forming apparatus 200 to recover from the energy-saving mode (step S1116) and the energy-saving controller 202 of the image forming apparatus 200 transmits a parameter (false) representing that the image forming apparatus 200 has recovered from the energy-saving mode to the sub energy-saving controller 112 of the operation device 100 (step S1117). Accordingly, recovery control in the operation device 100 starts.

The case 1120 where the image forming apparatus 200 recovers during the post-sleep processing will be described here. The application 103 notifies the main energy-saving controller 111 of the result of the inquiry indicating that it is possible to transition to the sleep mode (step S1121).

The image forming apparatus 200 then receives a user's operation to cause the image forming apparatus 200 to recover from the energy-saving mode (step S1122) and the energy-saving controller 202 of the image forming apparatus 200 transmits a parameter (false) indicating that the energy-saving mode has ended to the sub energy-saving controller 112 of the operation device 100 (step S1123).

The sub energy-saving controller 112 of the operation device 100 receives the parameter (false) indicating that the energy-saving mode has ended and thus holds the determination value "F" (step S1124).

On the other hand, the main energy-saving controller 111 of the operation device 100 performs the post-sleep processing for upper layers including the application 103 (step S1125). The main energy-saving controller 111 then transmits an instruction to enter the sleep mode to the sub energy-saving controller 112 (step S1126).

After receiving the instruction to enter the sleep mode, the sub energy-saving controller 112 determines whether there is a difference from the image forming apparatus 200 in the energy-saving mode (step S1127). The sub energy-saving controller 112 holds the determination value "F" and thus determines that a difference from the image forming apparatus 200 occurs in the energy-saving mode. Thus, the sub energy-saving controller 112 issues an instruction to recover from the sleep to the main energy-saving controller 111 (step S1128).

In the embodiment, in the case where the operation device 100 and the image forming apparatus 200 are able to perform the energy-saving control independently, control is performed such that no difference in the energy-saving transition control occurs between the operation device 100 and the image forming apparatus 200, which deters the convenience to users from lowering.

For example, the main energy-saving controller 111 notifies the sub energy-saving controller 112 of the energy-saving mode in the image forming apparatus 200, which deters the difference from occurring.

In the operation device 100 of the embodiment, the notification of start of detection of a difference in the energy-saving mode is communicated between the main energy-saving controller 111 that performs the energy-saving control on the application and the sub energy-saving controller that performs the energy-saving control on the hardware and the notification of the energy-saving mode of the image forming apparatus 200 contains an expectation, which makes it easy to recognize the energy-saving mode of the image forming apparatus 200 and thus deters a difference in control.

The sub energy-saving controller 112 holds the initial determination value based on the expectation and the value of the mode at the time of request when the process to transition to the energy-saving mode is started and accordingly, even when a notification of the energy-saving mode does not come from the image forming apparatus 200 or a delay occurs in the image forming apparatus 200, it is possible to determine whether a difference occurs based on the initial determination value. This makes it possible to deter a difference from the image forming apparatus 200 from occurring in the energy-saving mode. Accordingly, it is possible to prevent the convenience to users from lowering.

A program that is executed by the operation device of the embodiment is recorded in a computer-readable recording medium, such as a CD-ROM, a flexible disk (FD), a CD-R, or a digital versatile disk (DVD), in a file in an installable form or an executable form and is provided.

The program that is executed by the operation device of the embodiment may be configured to be stored in a computer that is connected to a network, such as the Internet, and to be downloaded via the network to be provided. The program that is executed by the operation device of the embodiment may be configured to be provided or distributed via a network, such as the Internet.

The program of the embodiment may be configured to be incorporated in, for example, a ROM, in advance to be provided.

The program that is executed by the operation device of the embodiment has a module configuration including each of the above-described units (the application, the first energy-saving controller, the second energy-saving controller and the communication controller). With respect to practical hardware, for example, the CPU (processor) reads the program from the storage medium and executes the program and accordingly each of the above-described units is loaded into the main storage device and the application, the first energy-saving controller, the second energy-saving controller and the communication controller are generated in the main storage device.

According to the embodiment, there is an effect that convenience to users is deterred from lowering.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing device comprising:
a communication interface configured to communicate with a host device; memory storing computer-readable instructions; and
one or more processors configured to execute the computer-readable instructions such that the one or more processors are configured to perform operations including,
receiving, from the host device, a transition notification to cause a power mode of the information processing device to transition to energy-saving mode;
determining whether to cause the information processing device to transition to the energy-saving mode, according to a power mode of the host device at a time of receiving the transition notification;

when it is determined that the information processing device is caused to transition to the energy-saving mode, performing transition control to cause the information processing device to transition to the energy-saving mode;

when the transition control is performed based on reception of the transition notification, determine whether there is a difference between the power mode of the host device and the power mode of the information processing device, and when it is determined that there is the difference, determine not to perform the transition control;

wherein the one or more processors are configured to receive, from the host device, the mode notification relating to the power mode of the host device, when receiving the mode notification, cause application installed in the information processing device to transition to energy-saving mode, after causing the application to transition to the energy-saving mode, determine whether to cause hardware of the information processing device to transition to energy-saving mode according to the power mode of the host device at a time of receiving the transition notification, and when it is determined that the information processing device is caused to transition to the energy-saving mode, cause the hardware to transition to the energy-saving mode, wherein the one or more processors are configured to receive, from the host device, the mode notification relating to the power mode of the host device, and determine whether to meet a predetermine condition that the information processing device is caused to transition to the energy-saving mode regardless of the transition notification, and when it is determined that the predetermine condition is met, determine whether to perform the transition control according to the power mode of the host device indicated by the mode notification.

2. The information processing device according to claim 1, wherein the one or more processors are configured to receive, from the host device, a mode notification relating to the power mode of the host device, and when the mode notification is not received from the host device after the transition notification is received, determine to perform the transition control.

3. The information processing device according to claim 1, wherein the one or more processors are configured to receive, from the host device, the mode notification relating to the power mode of the host device, and when the mode notification is received after the transition notification is received from the host device and when the mode notification indicates that the power mode of the host device is the power-saving mode, determine to perform the transition control.

4. The information processing device according to claim 1, wherein the one or more processors are configured to receive, from the host device, the mode notification relating to the power mode of the host device, and when the mode notification is received after the transition notification is received from the host device and when the mode notification indicates that the power mode of the host device is not the power-saving mode, determine not to perform the transition control.

5. The information processing device according to claim 1, wherein the one or more processors are configured to receive, from the host device, the mode notification relating to the power mode of the host device, and determine whether to meet a predetermine condition that the information processing device is caused to transition to the energy-saving mode regardless of the transition notification, and when it is determined that the predetermine condition is met, determine whether to perform the transition control according to the power mode of the host device indicated by the mode notification.

6. The information processing device according to claim 5, wherein the one or more processors are configured to after receiving, from the host device, the mode notification indicating that the power mode of the host device is not the energy-saving mode, when it is determined that the predetermined condition is met, determine not to perform the transition control.

7. The information processing device according to claim 5, wherein the one or more processors are configured to when the mode notification is not received after determining that the predetermined condition is met, determine to perform the transition control.

8. The information processing device according to claim 5, wherein the one or more processors are configured to when the mode notification is received after determining the predetermined condition is met and when the mode notification indicates that the power mode of the host device is not the energy-saving mode, determine not to perform the transition control.

9. The information processing device according to claim 1, wherein the one or more processors are configured to when it is determined that the information processing device is not caused to transition to the energy-saving mode, prohibit the transition of the power mode of the information processing to the energy-saving mode or recover a function of the information processing device having transitioned to the energy-saving mode.

10. An information processing system, comprising:

an information processing device having a communication interface configured to communicate with a host device;

memory storing computer-readable instructions; and one or more processors configured to execute the computer-readable instructions such that the one or more processors are configured to perform operations including, receiving, from the host device, a transition notification to cause a power mode of the information processing device to transition to energy-saving mode;

determining whether to cause the information processing device to transition to the energy-saving mode, according to a power mode of the host device at a time of receiving the transition notification;

performing transition control to cause the information processing device to transition to the energy-saving mode when it is determined that the information processing device is caused to transition to the energy-saving mode;

receiving, from the host device, the mode notification relating to the power mode of the host device;

determining whether to meet a predetermine predetermined condition that the information processing device is caused to transition to the energy-saving mode regardless of the transition notification, when it is determined that the predetermined condition is met, determining whether to perform the transition control according to the power mode of the host device indicated by the mode notification;
when the transition control is performed based on reception of the transition notification, determine whether there is a difference between the power mode of the host device and the power mode of the information processing device, and
when it is determined that there is the difference, determine not to perform the transition control;
wherein the one or more processors are configured to
receive, from the host device, the mode notification relating to the power mode of the host device,
when receiving the mode notification, cause application installed in the information processing device to transition to energy-saving mode,
after causing the application to transition to the energy-saving mode, determine whether to cause hardware of the information processing device to transition to energy-saving mode according to the power mode of the host device at a time of receiving the transition notification, and
when it is determined that the information processing device is caused to transition to the energy-saving mode, cause the hardware to transition to the energy-saving mode, wherein the one or more processors are configured to
receive, from the host device, the mode notification relating to the power mode of the host device, and
determine whether to meet a predetermine condition that the information processing device is caused to transition to the energy-saving mode regardless of the transition notification, and
when it is determined that the predetermine condition is met, determine whether to perform the transition control according to the power mode of the host device indicated by the mode notification.

11. A non-transitory computer program product that contains a computer program that causes a computer of an information processing device, to execute:
receiving, from a host device, a transition notification to cause a power mode of the information processing device to transition to an energy-saving mode;
determining whether to cause the information processing device to transition to the energy-saving mode, according to a power mode of the host device at a time of receiving the transition notification;
performing transition control to cause the information processing device to transition to the energy-saving mode when it is determined that the information processing device is caused to transition to the energy-saving mode;
receiving, from the host device, a mode notification relating to the power mode of the host device;
determining whether to meet a predetermine condition that the information processing device is caused to transition to the energy-saving mode regardless of the transition notification;
determining whether to perform the transition control according to the power mode of the host device indicated by the mode notification when it is determined that the predetermine condition is met,
when the mode notification is not received after determining that the predetermined condition is met, determine to perform the transition control,
when the transition control is performed based on reception of the notification, determine whether there is a difference between the power mode of the host device and the power mode of the information processing device, and
when it is determined that there is the difference, determine not to perform the transition control;
wherein the one or more processors are configured to
receive, from the host device, the mode notification relating to the power mode of the host device,
when receiving the mode notification, cause application installed in the information processing device to transition to energy-saving mode,
after causing the application to transition to the energy-saving mode, determine whether to cause hardware of the information processing device to transition to energy-saving mode according to the power mode of the host device at a time of receiving the transition notification, and
when it is determined that the information processing device is caused to transition to the energy-saving mode, cause the hardware to transition to the energy-saving mode, wherein the one or more processors are configured to
receive, from the host device, the mode notification relating to the power mode of the host device, and
determine whether to meet a predetermine condition that the information processing device is caused to transition to the energy-saving mode regardless of the transition notification, and
when it is determined that the predetermine condition is met, determine whether to perform the transition control according to the power mode of the host device indicated by the mode notification.

\* \* \* \* \*